(12) United States Patent
Sheiman et al.

(10) Patent No.: US 7,792,196 B2
(45) Date of Patent: Sep. 7, 2010

(54) SINGLE CONDUCTOR BIDIRECTIONAL COMMUNICATION LINK

(75) Inventors: Arthur Sheiman, Mountain Lakes, NJ (US); Matt Runo, Summit, NJ (US)

(73) Assignee: Intel Corporation, Santa Clara, CA (US)

( * ) Notice: Subject to any disclaimer, the term of this patent is extended or adjusted under 35 U.S.C. 154(b) by 1568 days.

(21) Appl. No.: 11/027,497

(22) Filed: Dec. 28, 2004

(65) Prior Publication Data

US 2006/0140284 A1   Jun. 29, 2006

(51) Int. Cl.
    *H04B 3/00* (2006.01)
(52) U.S. Cl. .................. 375/257; 375/220; 370/276
(58) Field of Classification Search .............. 375/295, 375/316, 220, 257; 370/276
    See application file for complete search history.

(56) References Cited

U.S. PATENT DOCUMENTS

| | | | | |
|---|---|---|---|---|
| 3,530,260 A | * | 9/1970 | Gaunt, Jr. | 379/405 |
| 3,566,046 A | * | 2/1971 | McCormick et al. | 455/3.05 |
| 3,648,517 A | * | 3/1972 | Dorman | 73/861.09 |
| 3,889,072 A | * | 6/1975 | Stewart | 379/344 |
| 4,048,625 A | * | 9/1977 | Harris et al. | 358/1.16 |
| 4,074,087 A | * | 2/1978 | Blake et al. | 379/344 |
| 4,162,371 A | * | 7/1979 | Belforte | 370/284 |
| 4,377,843 A | * | 3/1983 | Garringer et al. | 710/71 |
| 4,485,277 A | * | 11/1984 | Minch et al. | 379/345 |
| 4,556,958 A | * | 12/1985 | Ugon | 714/49 |
| 4,638,473 A | * | 1/1987 | Cooperman et al. | 370/284 |
| 4,682,356 A | * | 7/1987 | Minch et al. | 379/347 |
| 4,698,800 A | * | 10/1987 | Cavaliere et al. | 370/284 |
| 4,706,082 A | * | 11/1987 | Miesterfeld et al. | 710/240 |
| 4,813,066 A | * | 3/1989 | Holtz et al. | 379/413 |
| 4,979,095 A | * | 12/1990 | Ghaffari | 710/106 |
| 4,985,889 A | * | 1/1991 | Frankish et al. | 370/395.3 |
| 5,216,667 A | * | 6/1993 | Chu et al. | 370/276 |
| 5,253,249 A | * | 10/1993 | Fitzgerald et al. | 370/276 |
| 5,280,526 A | * | 1/1994 | Laturell | 379/405 |
| 5,541,535 A | * | 7/1996 | Cao et al. | 326/83 |
| 5,604,450 A | * | 2/1997 | Borkar et al. | 326/82 |
| 5,748,887 A | * | 5/1998 | Kim et al. | 714/52 |
| 5,790,526 A | * | 8/1998 | Kniess et al. | 370/257 |
| 5,801,549 A | * | 9/1998 | Cao et al. | 326/83 |
| 5,862,354 A | * | 1/1999 | Curiger et al. | 710/110 |
| 5,877,882 A | * | 3/1999 | Green et al. | 398/164 |
| 6,060,915 A | * | 5/2000 | McEwan | 327/94 |
| 6,108,751 A | * | 8/2000 | Lee et al. | 711/115 |
| 6,119,183 A | * | 9/2000 | Briel et al. | 710/316 |

(Continued)

FOREIGN PATENT DOCUMENTS

RU    2238613    * 10/2004

OTHER PUBLICATIONS

"The I2C-Bus Specification, Version 2.1", *Philips Semiconductors*, (Jan. 2000), 1-46.

*Primary Examiner*—Temesghen Ghebretinsae
(74) *Attorney, Agent, or Firm*—Schwegman, Lundberg & Woessner, P.A.

(57) ABSTRACT

A driver is coupled to a single conductor wire that may be electromagnetically shielded to drive serial signals on the wire, and a receiver is coupled to the wire and to the driver to receive serial signals from the wire at the same time.

14 Claims, 7 Drawing Sheets

U.S. PATENT DOCUMENTS

| | | | |
|---|---|---|---|
| 6,181,167 B1 * | 1/2001 | Agan | 326/86 |
| 6,222,388 B1 * | 4/2001 | Bridgewater, Jr. | 326/86 |
| 6,249,171 B1 * | 6/2001 | Yaklin et al. | 327/382 |
| 6,278,740 B1 * | 8/2001 | Nordyke | 375/257 |
| 6,317,061 B1 | 11/2001 | Batra et al. | |
| 6,348,811 B1 * | 2/2002 | Haycock et al. | 326/16 |
| 6,556,628 B1 * | 4/2003 | Poulton et al. | 375/257 |
| 6,597,197 B1 | 7/2003 | Mosley | |
| 6,622,188 B1 | 9/2003 | Goodwin et al. | |
| 6,625,206 B1 * | 9/2003 | Doblar | 375/219 |
| 6,738,417 B1 * | 5/2004 | Kim et al. | 375/220 |
| 6,781,108 B2 * | 8/2004 | Fujino | 250/214 A |
| 6,803,790 B2 * | 10/2004 | Haycock et al. | 326/82 |
| 6,894,266 B2 * | 5/2005 | Richard et al. | 250/214 R |
| 7,127,538 B1 * | 10/2006 | Nekl | 710/106 |
| 7,181,557 B1 * | 2/2007 | Falik et al. | 710/110 |
| 7,254,797 B2 * | 8/2007 | Garlepp | 716/10 |
| 7,327,995 B1 * | 2/2008 | Roo | 455/296 |
| 2002/0083232 A1 * | 6/2002 | Dute et al. | 710/31 |
| 2002/0097805 A1 * | 7/2002 | Casper et al. | 375/257 |
| 2002/0116196 A1 * | 8/2002 | Tran | 704/270 |
| 2002/0188683 A1 * | 12/2002 | Lytle et al. | 709/206 |
| 2003/0067325 A1 * | 4/2003 | Haycock et al. | 326/82 |
| 2004/0234015 A1 * | 11/2004 | Janapaty et al. | 375/350 |
| 2005/0089126 A1 * | 4/2005 | Zerbe et al. | 375/353 |
| 2005/0185720 A1 * | 8/2005 | Kwok | 375/257 |
| 2005/0201491 A1 * | 9/2005 | Wei | 375/326 |
| 2006/0075170 A1 * | 4/2006 | Behrendt et al. | 710/110 |
| 2006/0140284 A1 * | 6/2006 | Sheiman et al. | 375/257 |

* cited by examiner

SINGLE CONDUCTOR BIDIRECTIONAL COMMUNICATION LINK

TECHNICAL FIELD

This application relates generally to digital communications and, more particularly, to a single conductor bidirectional communications link.

BACKGROUND

Electronic systems with multiple components are often coupled together by communications links that support bidirectional communications between the components. Information exchanged over the links includes control, status, and alarm or interrupt information. Such information is important to the operation of a system, and the communications must take place without a loss or corruption of this information.

DETAILED DESCRIPTION

Figure 1:
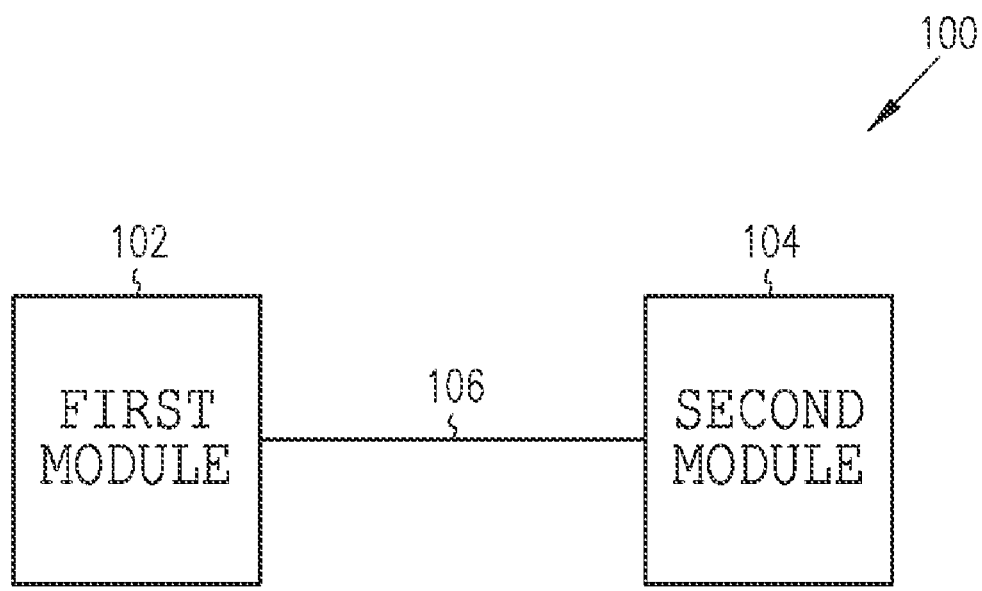
FIG. 1 illustrates a block diagram of a system according to various embodiments.

In the following detailed description of various embodiments, reference is made to the accompanying drawings that form a part hereof, and in which are shown by way of illustration, and not of limitation, specific embodiments in which the subject matter may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that compositional, structural, and logical substitutions and changes may be made without departing from the scope of this disclosure. The following detailed description, therefore, is not to be taken in a limiting sense.

Examples and embodiments merely typify possible variations. Individual components and functions are optional unless explicitly required, and the sequence of operations may vary. Portions and features of some embodiments may be included in or substituted for those of others. The following description is, therefore, not to be taken in a limiting sense.

A system 100 including a first module 102 and a second module 104 coupled together by a single conductor wire 106 is shown in FIG. 1 according to an embodiment. The system 100 is operated to couple serial signals from the first module 102 to the second module 104 and to couple serial signals from the second module 104 to the first module 102 on the wire 106. The serial signals may be serial digital signals according to an embodiment. The wire 106 is an electromagnetically shielded wire such as a coaxial cable having a shield coupled to ground. The first module 102 and the second module 104 are coupled to the wire 106 to implement bidirectional communication of control, status, and alarm or interrupt information over the wire 106. Bidirectional communication between the first module 102 and the second module 104 over the wire 106 is peer-to-peer or master-slave in alternate embodiments. In master-slave communication, either one of the first module 102 or the second module 104 is the master. The first module 102 is formed in a first integrated circuit chip and the second module 104 is formed in a second integrated circuit chip according to an embodiment.

Figure 2:
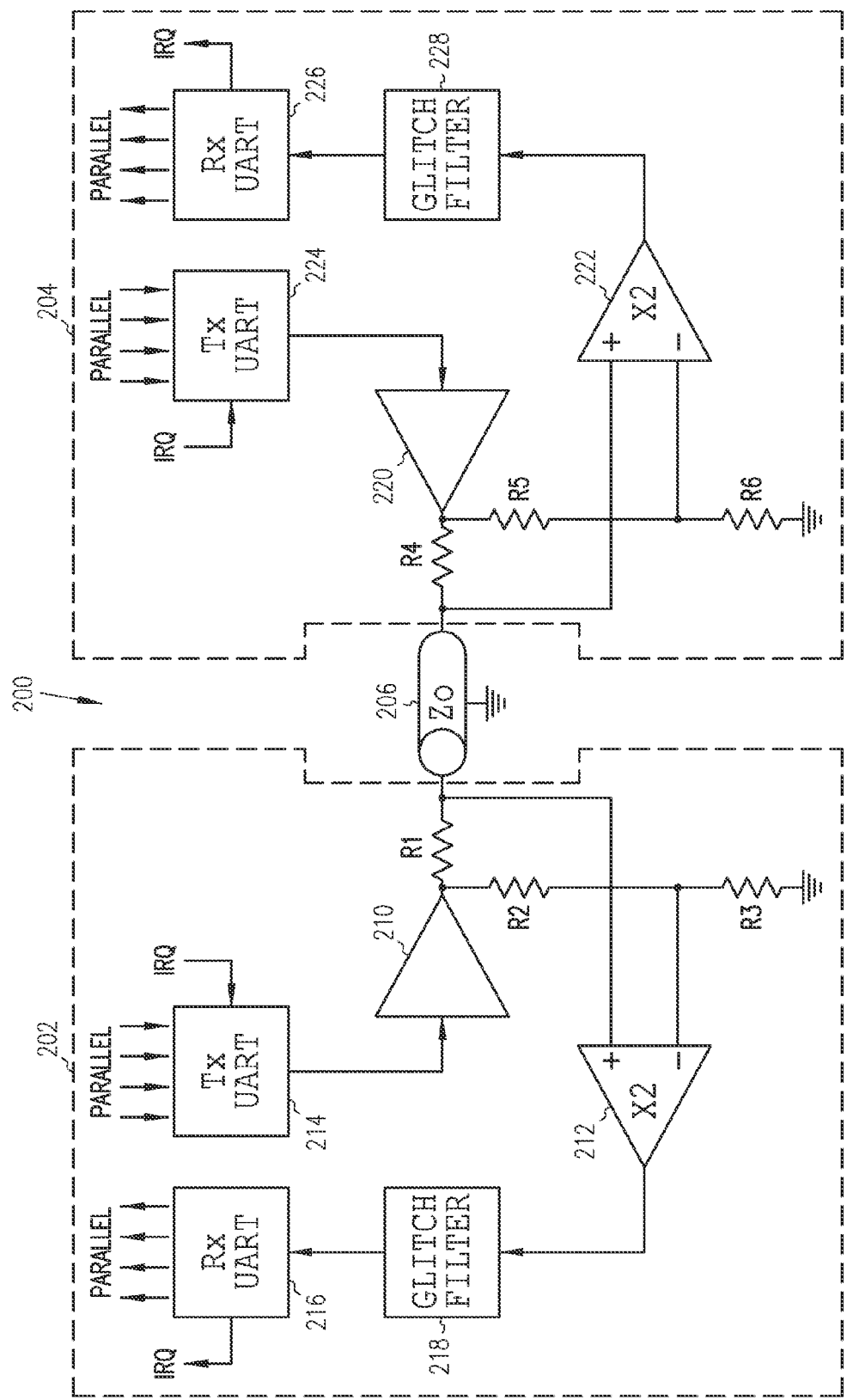
FIG. 2 illustrates an electrical schematic diagram of a system according to various embodiments.

A system 200 including a first module 202 and a second module 204 connected together by a single conductor wire 206 is shown in FIG. 2 according to an embodiment. The wire 206 is an electromagnetically shielded wire such as a coaxial cable with a shield that is coupled to ground, and has an impedance Zo.

The first module 202 includes a driver 210 having an output coupled to the wire 206 through a resistor R1 to drive serial digital signals on the wire 206. The driver 210 has a low output impedance and is a linear amplifier or a digital gate such as a buffer or an inverter according to alternate embodiments. The first module 202 also includes a receiver 212. The receiver 212 is a differential amplifier having an inverting input and an non-inverting input. The non-inverting input of the receiver 212 is coupled to the wire 206 to receive serial digital signals from the wire 206, and the inverting input is coupled to the output of the driver 210 through a resistor R2. The inverting input is also coupled to ground through a resistor R3 such that the resistors R2, R3 form a voltage divider to couple a reference voltage to the inverting input. The receiver 212 doubles the amplitude of the serial digital signals from the wire 206. The signals driven by the driver 210 on to the wire 206 and received by the receiver 212 from the wire 206 may be analog serial signals in alternate embodiments.

A transmitting universal asynchronous receiver-transmitter (UART) 214 is coupled to an input of the driver 210 to convert parallel digital signals into serial digital signals to be received by the driver 210, the driver 210 to drive the serial digital signals on the wire 206. A receiving UART 216 is coupled to an output of the receiver 212 to convert serial digital signals from the receiver 212 into parallel digital signals based on serial digital signals received by the receiver 212 from the wire 206. The transmitting UART 214 is coupled to receive a parallel interrupt request IRQ and to couple a serial interrupt request to the driver 210 in response to the parallel interrupt request. The receiving UART 216 is coupled to receive a serial interrupt request from the receiver 212 and to transmit a parallel interrupt request IRQ in response to the serial interrupt request. A glitch filter 218 is coupled between the receiver 212 and the receiving UART 216 to reduce the amplitude of noise spikes, also called glitches.

In one embodiment, the glitch filter 218 is a low pass filter such as an RC filter.

In another embodiment, the glitch filter 218 is a digital glitch filter that includes an UP/DOWN counter (not shown) that is coupled to a clock source (not shown) or has its own clock. The UP/DOWN counter generates a counter value and does not count below zero or above a high number such as ten. In other words, the UP/DOWN counter does not wrap. An output signal from the receiver 212 is coupled to the UP/DOWN counter that counts down when the output signal is low and counts up when the output signal is high. The output signal is determined to be high or low by comparing the counter value with a low threshold such as one and a high threshold such as three. If the UP/DOWN counter counts from a higher number to the low threshold one, the output signal has been low for multiple clock pulses, and the UP/DOWN counter indicates the output signal to be low. If the UP/DOWN counter counts from a lower number to the high threshold three, the output signal has been high for multiple clock pulses, and the UP/DOWN counter indicates the output signal to be high. In this way, the UP/DOWN counter determines whether the output signal is high or low with some hysteresis to filter glitches in the output signal.

In another embodiment, the receiving UART 216 is insensitive to glitches and the receiver 212 is coupled to the receiving UART 216 without the glitch filter 218 between them.

The second module 204 is a mirror image of the first module 202 according to an embodiment. The second module 204 includes a driver 220, a receiver 222, a transmitting UART 224, a receiving UART 226, and a glitch filter 228 coupled to the wire 206 in a manner similar to the manner of coupling of the corresponding elements in the first module 202. Resistors R4, R5, and R6 are coupled between the wire 206, the driver 220, and the receiver 222 in a manner similar to the coupling of the resistors R1, R2, and R3 between the wire 206 and the corresponding elements in the first module 202.

In one embodiment, Zo (the impedance of the wire 206), R1, and R4 are approximately 50 ohms, R2 is approximately equal to R3, and R5 is approximately equal to R6. In one embodiment, R2, R3, R5, and R6 are each approximately equal to 1000 ohms.

The first module 202 and the second module 204 are coupled to the wire 206 to implement digital bidirectional communication of control, status, and alarm or interrupt information over the wire 206. Bidirectional communication between the first module 202 and the second module 204 over the wire 206 is peer-to-peer or master-slave in alternate embodiments. In master-slave communication, either one of the first module 202 or the second module 204 is the master.

The first module 202 is formed in a first integrated circuit chip and the second module 204 is formed in a second integrated circuit chip according to an embodiment.

Figure 3:
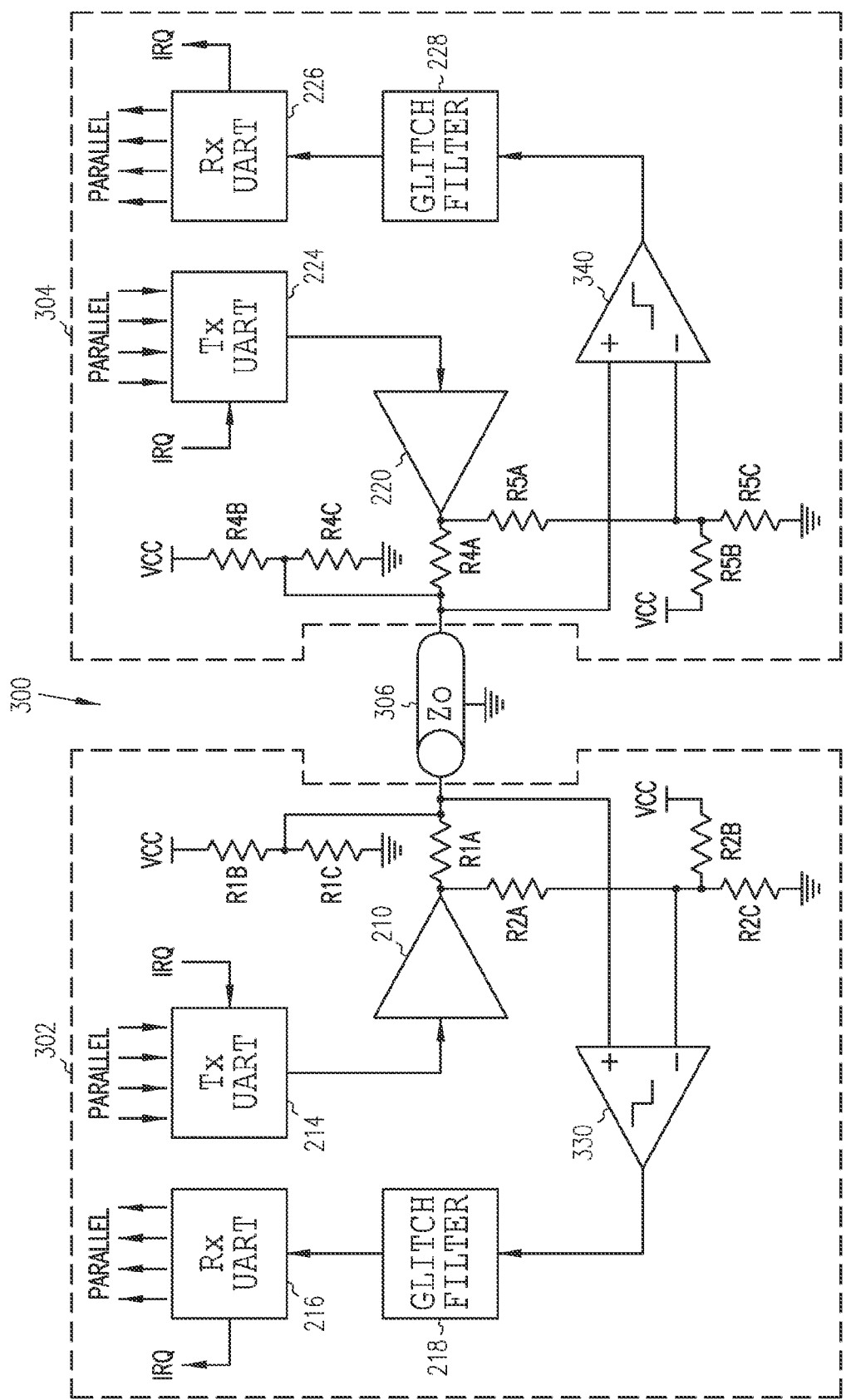
FIG. 3 illustrates an electrical schematic diagram of a system according to various embodiments.

A system 300 including a first module 302 and a second module 304 connected together by a single conductor wire 306 is shown in FIG. 3 according to an embodiment. The wire 306 is an electromagnetically shielded wire such as a coaxial cable with a shield that is coupled to ground, and has an impedance Zo. The system 300 is similar to the system 200 shown in FIG. 2, and elements common to both the system 200 and the system 300 have been given the same reference characters for purposes of brevity, and will not be discussed in detail.

An output of the driver 210 of the first module 302 is coupled to the wire 306 through a resistor R1A to drive serial digital signals on the wire 306. The first module 302 includes a receiver 330 that is a comparator having an inverting input and an non-inverting input. The non-inverting input of the receiver 330 is coupled to the wire 306 to receive serial digital signals from the wire 306, and to a connection between a resistor R1B and a resistor R1C. The resistors R1B and R1C form a voltage divider between a voltage supply VCC coupled to the resistor R1B and ground coupled to the resistor R1C. The inverting input of the receiver 330 is coupled to the output of the driver 210 through a resistor R2A. The inverting input of the receiver 330 is also coupled to the voltage supply VCC through a resistor R2B and to ground through a resistor R2C to couple a reference voltage to the inverting input. The receiver 330 indicates whether a signal on the wire 306 is high or low, and sends a corresponding signal to the receiving UART 216.

The second module 304 is a mirror image of the first module 302 according to an embodiment. The second module 304 includes a receiver 340 that is a comparator. Resistors R4A, R4B, and R4C are coupled to the wire 306 and the non-inverting input of the receiver 340 in a manner similar to the coupling of the resistors R1A, R1B, and R1C between the wire 306 and the corresponding elements in the first module 302. Resistors R5A, R5B, and R5C are coupled between the output of the driver 220 and the inverting input of the receiver 340 in a manner similar to the coupling of the resistors R2A, R2B, and R2C between the output of the driver 210 and the corresponding elements in the first module 302.

In one embodiment, VCC is approximately 5 Volts. The resistors R1A and R4A are approximately 154 ohms. The resistors R1B, R1C, R4B, and R4C are approximately 147 ohms. The resistors R2A and R5A are approximately 768 ohms. The resistors R2B, R2C, R5B, and R5C are approximately 294 ohms. The wattage for the resistors is ½₀ Watt for the 768 ohm resistors, ⅟₁₆ or ⅟₁₀ Watt for the 294 ohm resistors, ⅟₁₀ Watt for the 154 ohm resistors, and ¼ Watt for the 147 ohm resistors.

Exemplary operational voltages of the system 200 shown in FIG. 2 and the system 300 shown in FIG. 3 are calculated and shown in tabular form below according to embodiments. The following voltages are defined with reference to the elements shown in FIG. 2 and FIG. 3:

TOLD: "Transmit Output Left Data" is the left transmitting UART 214 digital output, 0 or 1.

TOLV: "Transmit Output Left Voltage" is the driver 210 voltage output, 0 V or 5 V. This voltage is at the junction of R1 and R2 or R1A and R2A.

RILP: "Receive Input Left Positive-input" is the positive input of the receiver 212.

RILN: "Receive Input Left Negative-input" is the negative input of the receiver 212.

ROLV: "Receive Output Left Voltage" is the voltage output of the receiver 212 or the receiver 330.

ROLD: "Receive Output Left Data" is the data output of the receiver 212 or the receiver 330 where the threshold voltage is 2.5 Volts.

TORD: "Transmit Output Right Data" is the transmitting UART 224 digital output, 0 or 1.

TORV: "Transmit Output Right Voltage" is the driver 220 voltage output, 0 V or 5 V. This voltage is at the junction of R4 and R5 or R4A and R5A.

RIRP: "Receive Input Right Positive-input" is the positive input of the receiver 222.

RIRN: "Receive Input Right Negative-input" is the negative input of the receiver 222.

RORV: "Receive Output Right Voltage" is the voltage output of the receiver 222 or the receiver 340.

RORD: "Receive Output Right Data" is the data output of the receiver 222 or the receiver 340 where the threshold voltage is 2.5 Volts.

CoaxV: "Coax Voltage" is the voltage on a center conductor of the wire 206 or the wire 306, each being a single wire coax according to the embodiments.

The calculated data assume a 5 Volt positive logic. A "0" will represent 0 Volts, and a "1" will represent 5 Volts. Systems 200 and 300 operate with binary logic according to the embodiments, and there are four system states as defined below:

| System State | UART 214 Output | UART 224 Output |
|---|---|---|
| 0 | 0 | 0 |
| 1 | 0 | 1 |
| 2 | 1 | 0 |
| 3 | 1 | 1 |

Voltages are shown below for the system 200 shown in FIG. 2 with Zo, R1, and R4 each equal to 50 ohms, R2=R3, and R5=R6. The calculated voltages in all the states in the system 200 are as follows according to the embodiment:

| State | TOLD | TORD | TOLV | TORV | CoaxV | RILP | RILN | ROLV | ROLD | RIRP | RIRN | RORV | RORD |
|---|---|---|---|---|---|---|---|---|---|---|---|---|---|
| 0 | 0 | 0 | 0.000 | 0.000 | 0.000 | 0.000 | 0.000 | 0.000 | 0 | 0.000 | 0.000 | 0.000 | 0 |
| 1 | 0 | 1 | 0.000 | 5.000 | 2.500 | 2.500 | 0.000 | 5.000 | 1 | 2.500 | 2.500 | 0.000 | 0 |
| 2 | 1 | 0 | 5.000 | 0.000 | 2.500 | 2.500 | 2.500 | 0.000 | 0 | 2.500 | 0.000 | 5.000 | 1 |
| 3 | 1 | 1 | 5.000 | 5.000 | 5.000 | 5.000 | 2.500 | 5.000 | 1 | 5.000 | 2.500 | 5.000 | 1 |

Note that the ROLD column is the same as the TORD column. This means that the module 202 receives exactly what the module 204 transmits, independent of what the module 202 transmits. Also, RORD is the same as TOLD, so the module 204 receives what the module 202 transmits independently of what the module 204 transmits.

Voltages are shown below for the system 300 shown in FIG. 3 with the following voltage and component values according to the embodiment. VCC is 5 Volts. R1A=R4A=154 ohms. R1B=R1C=R4B=R4C=147 ohms. R2A=R5A=768 ohms. R2B=R2C=R5B=R5C=294 ohms. Resistor wattage is ½0 Watt for the 768 ohm resistors, ⅟16 or ⅟10 Watt for the 294 ohm resistors, ⅟10 Watt for the 154 ohm resistors, and ¼ Watt for the 147 ohm resistors. The calculated voltages in all the states in the system 300 are as follows according to the embodiment:

| State | TOLD | TORD | TOLV | TORV | CoaxV | RILP | RILN | ROLV | ROLD | RIRP | RIRN | RORV | RORD |
|---|---|---|---|---|---|---|---|---|---|---|---|---|---|
| 0 | 0 | 0 | 0.000 | 0.000 | 1.692 | 1.692 | 2.098 | 0.000 | 0 | 1.692 | 2.098 | 0.000 | 0 |
| 1 | 0 | 1 | 0.000 | 5.000 | 2.500 | 2.500 | 2.098 | 5.000 | 1 | 2.500 | 2.902 | 0.000 | 0 |
| 2 | 1 | 0 | 5.000 | 0.000 | 2.500 | 2.500 | 2.902 | 0.000 | 0 | 2.500 | 2.098 | 5.000 | 1 |
| 3 | 1 | 1 | 5.000 | 5.000 | 3.308 | 3.308 | 2.902 | 5.000 | 1 | 3.308 | 2.902 | 5.000 | 1 |

The calculated voltages show that ROLD mimics TORD and RORD mimics TOLD.

The first module 302 and the second module 304 are coupled to the wire 306 to implement digital bidirectional communication of control, status, and alarm or interrupt information over the wire 306. Bidirectional communication between the first module 302 and the second module 304 over the wire 306 is peer-to-peer or master-slave in alternate embodiments. In master-slave communication, either one of the first module 302 or the second module 304 is the master.

The first module 302 is formed in a first integrated circuit chip and the second module 304 is formed in a second integrated circuit chip according to an embodiment.

Figure 4:
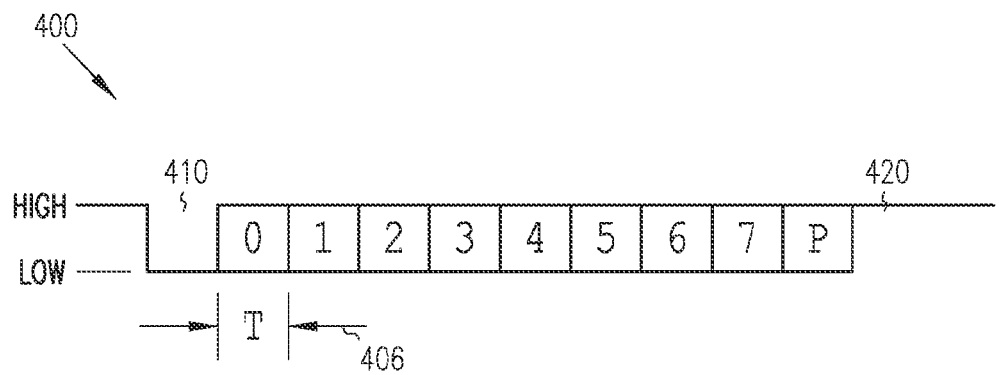
FIG. 4 illustrates a frame according to various embodiments.

The modules described above and shown in FIGS. 2 and 3 according to embodiments communicate with each other according to protocols. For example, the first module 202 of the system 200 sends digital data to the second module 204 grouped in frames transmitted serially according to a first protocol. A frame 400 sent from the first module 202 over the wire 206 to the second module 204 according to the first protocol is shown in FIG. 4 according to an embodiment. The frame 400 is a serial stream of bits that are represented by voltages on the wire 206, each bit lasting for a bit period T 406. When the wire 206 is at a high voltage HIGH, it is in a marking state. When the wire 206 is at a low voltage LOW, it is in a spacing condition. The wire 206 is in the marking state before the frame 400 is sent. The frame 400 begins with a start bit 410 that is LOW, and eight data bits (0-7) follow from a least significant bit (LSB) 0 to a most significant bit (MSB) 7.

A parity bit P follows the MSB 7, and a stop bit 420 follows the parity bit P. The stop bit 420 is HIGH. Another start bit signals the beginning of another frame. A break occurs when the wire 206 is put in the spacing condition for a period longer than one UART frame. This causes the receiving UART 226 to detect that something is wrong, and to identify this condition as a break. The frame 400 is generated by the transmitting UART 214 and driven onto the wire 206 by the driver 210 to be relayed by the receiver 222 to the receiving UART 226. The receiving UART 226 reconfigures the frame 400 into parallel data. The second module 204 of the system 200 sends digital data to the first module 202 in the same manner. The first and second modules 302 and 304 send digital data to each other over the wire 306 shown in FIG. 3 in the same manner according to an embodiment. This method of communication between modules requires that each receiving UART have its own clock source to trigger a detection of bits in each frame.

An interrupt request is implemented with a break according to embodiments. Specifically, the wire 206 or the wire 306 is put in the spacing condition for a period longer than one UART frame to request an interrupt.

The first module 202 and the second module 204 send digital data over the wire 206 at different times according to some embodiments. In other embodiments, the first module 202 and the second module 204 send digital data over the wire 206 at the same time, and this is called bidirectional communication. For higher speed communications, when bidirectional communication occurs, glitch filtering such as that provided by the glitch filter 218 may be necessary. Glitch filtering may not be necessary in embodiments where bidirectional communication is not employed. This is also true of the embodiments represented by the first module 302 and the second module 304 that send digital data over the wire 306 shown in FIG. 3.

The first module 202 of the system 200 sends digital data to the second module 204 according to a second protocol that does not require a receiving UART to have a separate clock source according to an embodiment illustrated with reference to FIGS. 5 and 6. The second protocol may be used when the second module 204 is to eliminate noise associated with an independent clock source such as an oscillator. The second module 204 may be a slave with respect to the first module 202. The second protocol requires that a receiving UART, such as the receiving UART 226, have additional logic circuits 500 shown in FIG. 5.

Figure 5:
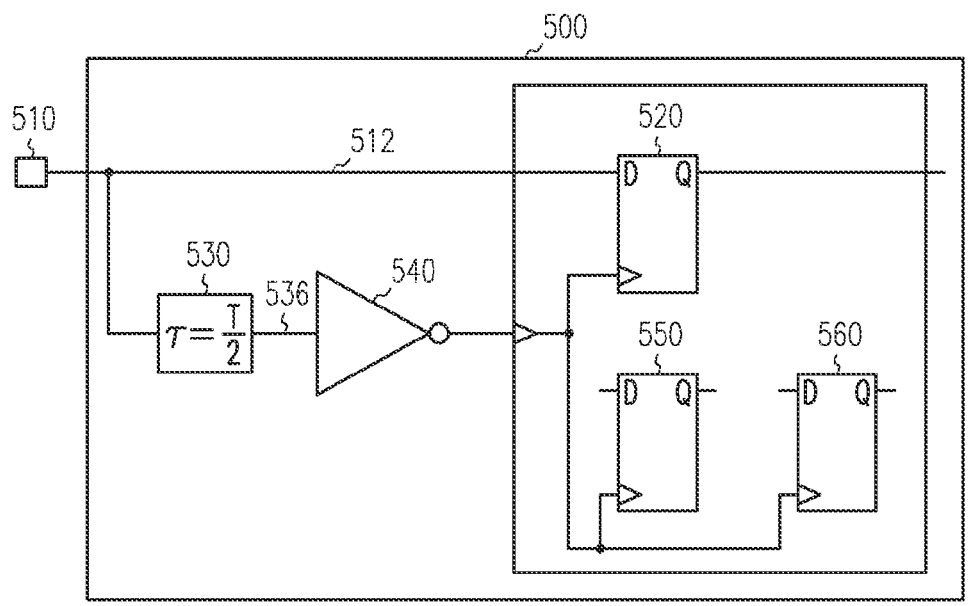
FIG. 5 illustrates an electrical schematic diagram of circuits according to various embodiments.
Figure 6:
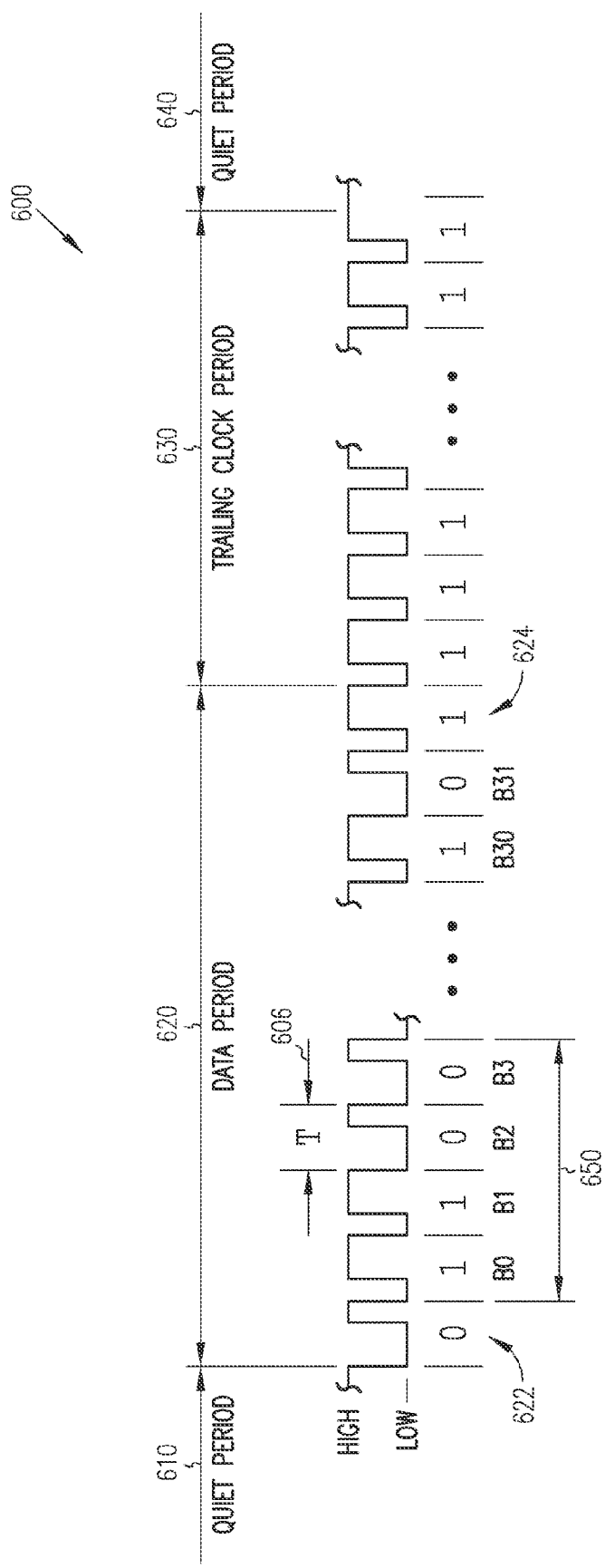
FIG. 6 illustrates a serial signal according to various embodiments.

The logic circuits 500 shown in FIG. 5 receive a serial signal 600 shown in FIG. 6 from the wire 206 through a receiver such as the receiver 222 at a terminal 510. The serial signal 600 is passed on a line 512 to a D input of a flip-flop 520, and to an input of a delay circuit 530 that delays the serial signal 600 by ½ of a period T 606 of a bit in the serial signal 600. A delayed serial signal on a line 536 is inverted by an inverter 540 and coupled to a positive-edge clock input of the flip-flop 520. This causes the flip-flop 520 to sample bits of the serial signal 600 at a center of each bit to determine if the bit is a 1 or a 0. The inverted and delayed serial signal is coupled to positive-edge clock inputs of other logic elements 550 and 560 in the logic circuits 500.

Portions of the serial signal 600 are not shown in FIG. 6 and are replaced by empty space to shorten the representation of the serial signal 600. The serial signal 600 is a serial stream of bits that are represented by voltages on the wire 206, each bit lasting for the period T 606. When the wire 206 is at a high voltage HIGH, it is in a marking state. When the wire 206 is at a low voltage LOW, it is in a spacing condition. In the serial signal 600, a negative edge transition is created at a start of each bit, and there is a single positive edge transition that occurs during each bit. If the data represented by the bit is 0, the positive edge transition occurs ¾ of the way through the period T of the bit. If the data represented by the bit is 1, the positive edge transition occurs ¼ of the way through the period T of the bit. Therefore, a 1 bit is HIGH for three quarters of the period T, and a 0 bit is HIGH for one quarter of the period T.

The negative edge transition at the start of each bit in the serial signal 600 is delayed by ½ of the period T by the delay circuit 530 and is inverted by the inverter 540 into a positive edge transition before being coupled to the positive-edge clock input of the flip-flop 520. This causes the flip-flop 520 to sample bits of the serial signal 600 at a center of each bit to determine if the bit is a 1 or a 0.

The serial signal 600 is divided into three periods. A quiet period 610 is when the voltage on the wire 206 is kept steadily HIGH with no transitions. The voltage on the wire 206 may also be kept steadily LOW in the quiet period 610 according to an embodiment. The quiet period 610 reduces noise in the second module 204. A data period 620 is when the transmitting UART 214 transfers data over the wire 206 to the receiving UART 226. During the data period 620, bits are transmitted over the wire 206 including a start bit 622 followed by a LSB B0, data bits B1-B30, and a MSB B31. A stop bit 624 follows the MSB B31. The bits transmitted during the data period 620 may include a parity bit according to an embodiment. The receiving UART 226 may need to trigger logic gates with additional clock edges after the end of the data period 620, so a trailing clock period 630 follows the data period 620 and includes additional 1 bits to provide clock edges for the receiving UART 226. The 1 bits are HIGH for three quarters of the period T and do not cause false commands to be interpreted by the receiving UART 226. The additional 1 bits in the trailing clock period 630 provide clock edges used by the receiving UART 226 to perform its work. At the end of the trailing clock period 630, all work is completed by the receiving UART 226, and the serial signal 600 returns to a steady HIGH with no transitions in another quiet period 640. The first module 202 may drive another serial signal 600 on the wire 206 to the second module 204 with another set of data, such as a command, after the quiet period 640.

In one embodiment, a data word of the second protocol has a 32-bit length including 8 bits of protocol header and 24 bits of data. A first nibble 650 including bits B0-B3 represents "3", indicating to the second module 204 that it should return 24 bits of data from a register "3." A second nibble may represent "4" indicating to the second module 204 that the data is intended for a register 4. The next 24 bits are data. A nibble is a contiguous group of four bits.

The receiving UART 226 reconfigures the data bits B0-B31 into parallel data. The second module 204 of the system 200 may also send digital data to the first module 202 in the same manner. One or both of the first and second modules 302 and 304 may send digital data to the other over the wire 306 shown in FIG. 3 in the same manner according to an embodiment.

Figure 7:
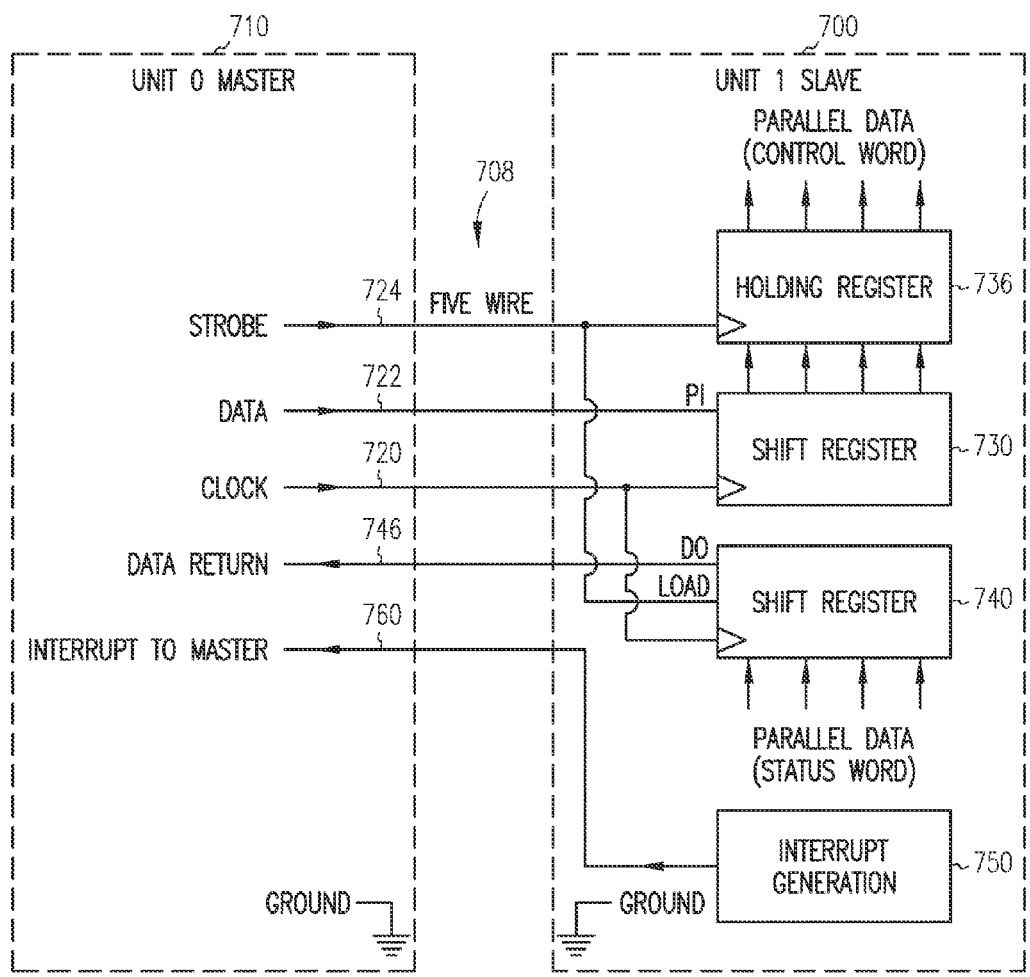
FIG. 7 illustrates an electrical schematic diagram of a system according to a brute force embodiment.

A slave module 700 with a 5 wire interface that would be used between a master module 710 and the slave module 700 is shown in FIG. 7 according to a brute force embodiment. The slave module 700 is capable of bidirectional communications with interrupt capability in one direction over a communications link 708 with the master module 710. Since the master module 710 controls the communications, an interrupt from the master module 710 to the slave module 700 is available. However, since the communications link 708 will remain idle to reduce switching-noise radiation, it is important to provide interrupt capability from the slave module 700 so that the critical alarm status can be fetched with minimum delay. If the requirement was for peer-to-peer communications rather than master-slave, a 6-wire interface might be used according to an embodiment with 3 wires/pins for clock, data, and strobe in each direction. The single conductor wire embodiments described prior can now be seen as significant reduction of wires to the brute force embodiment.

Operation between the slave module 700 and the master module 710 of FIG. 7 is described as follows. When the master module 710 needs to send data to the slave module 700, the master module 710 clocks in data using clock and data signals 720, 722. The master module 710 uses a strobe 724 to latch data from a first shift register 730 to a holding register 736 to update new slave control data. Return status can also be performed at the same time, and the slave module 700 sends its status data from a second shift register 740 on a return data line 746. The slave module 700 must wait for the master module 710 to control the communications over the communications link 708. There is no peer-to-peer mode in this embodiment. An interrupt from an interrupt generation unit 750 in the slave module 700 to the master module 710 is provided on a line 760 to wake up the master module 710 and request it to read a critical alarm status.

Figure 8:
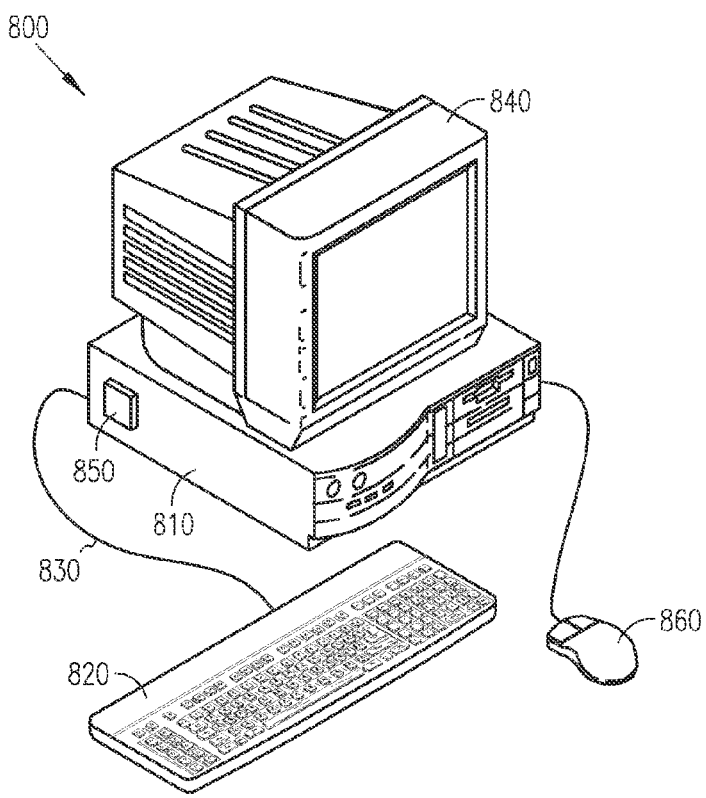
FIG. 8 illustrates a perspective view of a computer system according to various embodiments.

A perspective view of a computer system 800 is shown in FIG. 8 according to an embodiment. The system 800 includes a computer 810 coupled to a keyboard 820 through an interface 830. The interface 830 includes an electromagnetically shielded wire (not shown) coupled between a module in the keyboard 820 and a module in the computer 810 according to an embodiment. The computer 810 is also coupled to a monitor 840. The computer 810 includes a hard disk drive 850. The computer 810 further includes a microprocessor, random access memory (RAM), read only memory (ROM), and additional storage devices such as a floppy disk drive (into which a floppy disk can be inserted), an optical disk drive, and a digital tape cartridge drive according to alternate embodiments. The monitor 840 permits the display of information for viewing by a user of the computer 810. The monitor 840 may be a cathode ray tube (CRT) display or a flat panel display such as a liquid crystal display (LCDs). A pointing device 860 coupled to the computer 810 permits the control of a screen pointer. The pointing device 860 may be a mouse, a touch pad, a trackball, or a point stick. The keyboard 820 and the computer 810 are coupled to the electromagnetically shielded wire in the interface 830 to implement digital bidirectional communication of control, status, and alarm or interrupt information over the electromagnetically shielded wire as described in the embodiments above to save one or more wires in the interface 830.

The keyboard 820 is an input/output device. Embodiments are not limited to use with a keyboard. In alternate embodiments, any input/output device may be coupled to the computer 810 through the electromagnetically shielded wire described above including, but not limited to, Personal Digital Assistants (PDAs), portable audio players, portable video players, telephones, printers, multi-functional peripherals, facsimile machines, imaging devices, appliances, and other devices.

Figure 9:
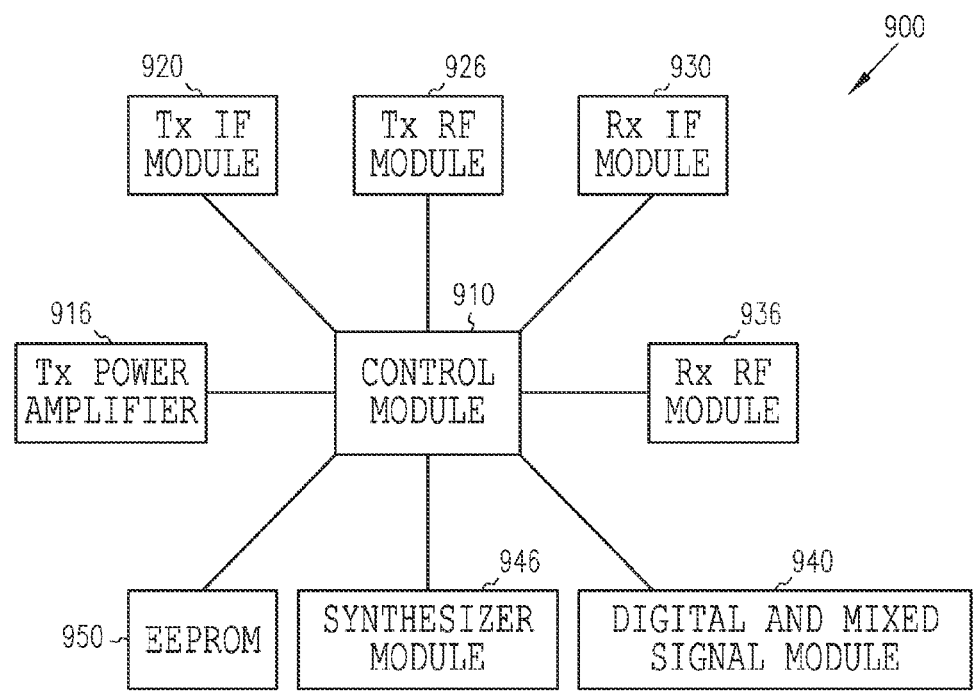
FIG. 9 illustrates a block diagram of a radio unit of a macro base station according to various embodiments.

A block diagram of a radio unit 900 of a macro base station is shown in FIG. 9 according to an embodiment. The radio unit 900 has a control module 910 coupled to a transmit power amplifier module 916, a transmit IF module 920, a transmit RF module 926, a receiver IF module 930, a receiver RF module 936, a digital and mixed-signal module 940, a synthesizer module 946, and an electrically erasable and programmable read only memory (EEPROM) 950. The EEPROM 950 is a computer-readable medium that stores computer-readable and computer-executable instructions. The control module 910 is coupled to exchange information with the EEPROM 950. The control module 910 executes instructions stored in the EEPROM 950 to control the operation of the radio unit 900.

In operation, the control module 910 might command the synthesizer module 946 to change frequencies, or it might send power control commands to the transmit RF module 926 to adjust a transmit level. The control module 910 might receive status information such as a signal strength from the receiver RF module 936 or a temperature of the transmit power amplifier module 916. The control module 910 might receive an alarm from, for example, the synthesizer module 946 that is shutting down its output because a phase-locked loop (PLL) is unlocked. In general, a complex macro-base station radio unit manages important control, status, and alarm data.

One or more of the individual lines coupling the control module 910 to the modules 916-946 and the EEPROM 950 is a single electromagnetically shielded wire over which digital bidirectional communication of control, status, and alarm or interrupt information takes place as is described above.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" may be used as the plain-English equivalents of the respective terms "comprising" and "wherein," respectively. Moreover, the terms "first," "second," and "third," etc. are used merely as labels, and are not intended to impose numerical requirements on their objects.

What is claimed is:

1. A system comprising:
   a first module;
   a second module; and
   a single conductor wire that is electromagnetically shielded coupled between the first module and the second module to couple serial digital signals from the first module to the second module and to couple serial digital signals from the second module to the first module at the same time to support bidirectional communication between the first module and the second module; and
   wherein each of the first module and the second module comprise:
      a driver coupled to the wire to drive serial digital signals on the wire, the driver having a low output impedance and comprising a linear amplifier or a digital gate, the digital gate comprising a buffer or an inverter;
      a first universal asynchronous receiver-transmitter (UART) coupled to the driver to convert parallel digital signals into serial digital signals to be received by the driver, the driver to drive the serial digital signals on the wire;
      a receiver coupled to the wire and the driver to receive serial digital signals from the wire, the receiver comprising a differential amplifier or a comparator having an inverting input and a non-inverting input, the inverting input being coupled to an output of the driver through a voltage divider to receive a reference voltage, and the non-inverting input being coupled to the wire; and
      a second UART coupled to the receiver to convert serial digital signals from the receiver into parallel digital signals based on serial digital signals received by the receiver from the wire.

2. The system of claim 1 wherein:
the first module is formed in a first integrated circuit chip; and
the second module is formed in a second integrated circuit chip.

3. The system of claim 1 wherein the first module comprises a control module in a radio unit in a macro base station.

4. The system of claim 1 wherein:
the first module comprises a keyboard; and
the second module comprises a personal computer.

5. The system of claim 1 wherein:
the first UART is coupled to receive a parallel interrupt request and to couple a serial interrupt request to the driver in response to the parallel interrupt request; and
the second UART is coupled to receive a serial interrupt request from the receiver and to transmit a parallel interrupt request in response to the serial interrupt request.

6. The system of claim 1 wherein the second UART is insensitive to glitches.

7. The system of claim 1, further comprising a glitch filter coupled between the receiver and the second UART, the glitch filter comprising a digital glitch filter or an analog low-pass filter comprising a capacitor and a resistor to reduce glitches.

8. The system of claim 1 wherein the wire comprises a coaxial cable.

9. The system of claim 3 wherein the second module comprises a transmit power amplifier module in the radio unit in the macro base station.

10. The system of claim 3 wherein the second module comprises a synthesizer module in the radio unit in the macro base station.

11. The system of claim 3 wherein the second module comprises a digital and mixed-signal module in the radio unit in the macro base station.

12. The system of claim 3 wherein the second module comprises one of a transmit RF module, a transmit IF module, a receiver RF module, and a receiver IF module in the radio unit in the macro base station.

13. A system comprising:
a keyboard;
a personal computer;
a hard disk drive in the personal computer; and
a single conductor wire that is electromagnetically shielded coupled between the keyboard and the personal computer to couple serial digital signals from the keyboard to the personal computer and to couple serial digital signals from the personal computer to the keyboard at the same time to support bidirectional communication between the keyboard and the personal computer; and
wherein each of the keyboard and the personal computer comprise:
a driver coupled to the wire to drive serial digital signals on the wire, the driver having a low output impedance and comprising a linear amplifier or a digital gate, the digital gate comprising a buffer or an inverter;
a first UART coupled to the driver to convert parallel digital signals into serial digital signals to be received by the driver;
a receiver coupled to the wire and the driver to receive serial digital signals from the wire, the receiver comprising a differential amplifier or a comparator having an inverting input and a non-inverting input, the inverting input being coupled to an output of the driver through a voltage divider to receive a reference voltage, and the non-inverting input being coupled to the wire; and
a second UART coupled to the receiver to convert serial digital signals from the receiver into parallel digital signals based on serial digital signals received by the receiver from the wire.

14. The system of claim 13 wherein each of the keyboard and the personal computer are coupled to drive serial control signals, serial status signals, and serial interrupt signals on to the wire and to receive serial control signals, serial status signals, and serial interrupt signals from the wire.

* * * * *